US010496978B2

(12) United States Patent
Runyan (10) Patent No.: US 10,496,978 B2
(45) Date of Patent: *Dec. 3, 2019

(54) SOCIAL PROXIMITY PAYMENTS (71) Applicant: PAYPAL, INC., San Jose, CA (US)

(72) Inventor: William Henry Runyan, Austin, TX (US)

(73) Assignee: PAYPAL, INC., San Jose, CA (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/436,647

(22) Filed: Feb. 17, 2017

(65) Prior Publication Data
US 2017/0228718 A1 Aug. 10, 2017

Related U.S. Application Data (63) Continuation of application No. 13/248,836, filed on Sep. 29, 2011, now Pat. No. 9,576,284.

(51) Int. Cl.
*G06Q 40/00* (2012.01)
*G06Q 20/32* (2012.01)
(Continued)

(52) U.S. Cl.
CPC ......... *G06Q 20/322* (2013.01); *G06Q 20/327* (2013.01); *G06Q 20/3224* (2013.01);
(Continued)

(58) Field of Classification Search
CPC .. G06Q 20/3276; G06Q 20/36; G06Q 20/405; G06Q 20/02; G06Q 20/102;
(Continued)

(56) References Cited

U.S. PATENT DOCUMENTS 6,587,835 B1 7/2003 Treyz et al.
6,711,474 B1 3/2004 Treyz et al.
(Continued)

FOREIGN PATENT DOCUMENTS

WO WO 2011/041427 4/2011

OTHER PUBLICATIONS

Mobile payment forum releases proximity payment issues & recommendations document. (Jan. 12, 2007). Business Wire Retrieved from http://dialog.proquest.com/professional/docview/671825558?accountid=142257 on Jul. 23, 2019 (Year: 2007).*
(Continued)

*Primary Examiner* — Kito R Robinson
(74) *Attorney, Agent, or Firm* — Haynes and Boone, LLP (57) ABSTRACT

An application or App on a payer's mobile device is used to discover people known to the user and who are in close proximity to the user at the time of a payment request. Discovery can be through searching contact lists and/or social networks of the payer and/or through the payer device discovering contacts around the payer and then searching the payer's contact or social network list to see if there are any matches. These people are then shown to the user on the user device, such as with a photo, icon, name, and/or email address. The user selects desired ones, which causes requests to be sent to the selected people, such as through text, voice, or email, to the respective devices. The selected people can then easily confirm or authorize a payment be sent to the user or to a payee.

20 Claims, 8 Drawing Sheets

(51) Int. Cl.

| | | |
|---|---|---|
| *G06Q 20/42* | (2012.01) | |
| *G06Q 50/12* | (2012.01) | |
| G06Q 10/10 | (2012.01) | |
| G06Q 10/02 | (2012.01) | |
| G06Q 50/00 | (2012.01) | |
| G06Q 40/06 | (2012.01) | |
| G06Q 30/02 | (2012.01) | |
| G06Q 30/00 | (2012.01) | |
| G06Q 30/06 | (2012.01) | |
| G06Q 10/06 | (2012.01) | |
| H04W 4/021 | (2018.01) | |
| H04W 4/18 | (2009.01) | |
| H04W 64/00 | (2009.01) | |
| H04W 4/21 | (2018.01) | |

(52) U.S. Cl.
CPC ............ *G06Q 20/42* (2013.01); *G06Q 50/12* (2013.01); *G06Q 10/02* (2013.01); *G06Q 10/067* (2013.01); *G06Q 10/10* (2013.01); *G06Q 10/1057* (2013.01); *G06Q 30/00* (2013.01); *G06Q 30/02* (2013.01); *G06Q 30/0205* (2013.01); *G06Q 30/0208* (2013.01); *G06Q 30/0225* (2013.01); *G06Q 30/0241* (2013.01); *G06Q 30/0261* (2013.01); *G06Q 30/0275* (2013.01); *G06Q 30/0601* (2013.01); *G06Q 40/06* (2013.01); *G06Q 40/12* (2013.12); *G06Q 50/01* (2013.01); *H04W 4/021* (2013.01); *H04W 4/185* (2013.01); *H04W 4/21* (2018.02); *H04W 64/00* (2013.01)

(58) Field of Classification Search
CPC .... G06Q 20/14; G06Q 20/32; G06Q 20/3223; G06Q 20/3224
USPC .......................................................... 705/40
See application file for complete search history.

(56) References Cited

U.S. PATENT DOCUMENTS

| | | | |
|---|---|---|---|
| 6,961,562 B2 | 11/2005 | Ross | |
| 7,499,588 B2 | 3/2009 | Jacobs et al. | |
| 7,725,580 B1 | 5/2010 | Weigand et al. | |
| 8,019,532 B2* | 9/2011 | Sheha | G01C 21/20 340/995.1 |
| 8,090,616 B2 | 1/2012 | Proctor, Jr. et al. | |
| 8,135,624 B1 | 3/2012 | Ramalingam et al. | |
| 8,312,392 B2 | 11/2012 | Forutanpour et al. | |
| 8,326,770 B1* | 12/2012 | Weisman | G06Q 50/01 705/319 |
| 8,346,672 B1 | 1/2013 | Weiner et al. | |
| 8,509,734 B1 | 8/2013 | Gupta et al. | |
| 2002/0116329 A1* | 8/2002 | Serbetcioglu | G06Q 20/02 705/39 |
| 2003/0004743 A1 | 1/2003 | Callegari | |
| 2005/0259866 A1 | 11/2005 | Jacobs et al. | |
| 2006/0256074 A1 | 11/2006 | Krum et al. | |
| 2007/0175998 A1 | 8/2007 | Lev | |
| 2007/0235519 A1 | 10/2007 | Jang et al. | |
| 2008/0086261 A1 | 4/2008 | Robinson et al. | |
| 2008/0250025 A1 | 10/2008 | Abhyanker | |
| 2009/0233629 A1 | 9/2009 | Jayanthi | |
| 2010/0030578 A1* | 2/2010 | Siddique | G06Q 10/0637 705/3 |
| 2010/0063889 A1 | 3/2010 | Proctor, Jr. et al. | |
| 2010/0082481 A1 | 4/2010 | Lin et al. | |
| 2010/0121745 A1 | 5/2010 | Teckchandani et al. | |
| 2010/0274627 A1 | 10/2010 | Carlson | |
| 2011/0010291 A1 | 1/2011 | Adams | |
| 2011/0047075 A1 | 2/2011 | Fourez | |
| 2011/0054780 A1 | 3/2011 | Dhanani et al. | |
| 2011/0076941 A1 | 3/2011 | Taveau et al. | |
| 2011/0106712 A1* | 5/2011 | Calsyn | G06Q 10/06 705/300 |
| 2011/0148626 A1* | 6/2011 | Acevedo | G01S 5/0027 340/539.13 |
| 2011/0191697 A1 | 8/2011 | Sumner et al. | |
| 2011/0208852 A1 | 8/2011 | Looney et al. | |
| 2011/0238755 A1 | 9/2011 | Khan et al. | |
| 2011/0313837 A1 | 12/2011 | Katz et al. | |
| 2012/0136780 A1* | 5/2012 | El-Awady | G06Q 20/102 705/40 |
| 2012/0143761 A1 | 6/2012 | Doran et al. | |
| 2012/0166332 A1 | 6/2012 | Naaman | |
| 2012/0166337 A1 | 6/2012 | Park et al. | |
| 2012/0253852 A1 | 10/2012 | Pourfallah et al. | |
| 2012/0254029 A1 | 10/2012 | Layne et al. | |
| 2012/0265623 A1 | 10/2012 | Zhu et al. | |
| 2012/0290388 A1 | 11/2012 | Ganelli | |
| 2012/0290421 A1 | 11/2012 | Qawami et al. | |
| 2013/0041824 A1* | 2/2013 | Gupta | G06Q 20/14 705/44 |
| 2013/0251216 A1 | 9/2013 | Smowton et al. | |
| 2014/0001264 A1 | 1/2014 | Babu et al. | |
| 2015/0031393 A1 | 1/2015 | Post et al. | |

OTHER PUBLICATIONS

Joyanes et al., "ILAS/SMO: Intelligent location aware system for secure mobile payments using A-GPS enabled handsets", ProQuest Dialog, pp. 2 [online], [retrieved on Oct. 3, 2016]. Retrieved from the Internet: <URLhttp://dialog.proquest.com/professional/docview/846004783?accountid=14225>.

Tomoike, H., "Electronic payment system using accounting function in a mobile communication network", ProQuest Dialog, 1 page [online], [retrieved on Oct. 3, 2016]. Retrieved from the internet: <URL:http://dialog.proquest.com/professional/docview/1740971424?accountid=14225>.

Schattauer et al., "Location aware requests", ProQuest Dialog, 1 page [online], [retrieved on Oct. 3, 2016]. Retrieved from the Internet: <URL:http://dialoq.proquest.com/professional/docview/1541451813?accountid=142257>.

Rashid et al., "Interaction Techniques for Binding Smartphones: A Desirability Evaluation", Human Centered Design, Jul. 19-24, 2009, pp. 120-128, vol. 5619, Springer Berlin Heidelberg.

\* cited by examiner

SOCIAL PROXIMITY PAYMENTS

CROSS REFERENCE

This application is a continuation of U.S. patent application Ser. No. 13/248,836, filed Sep. 29, 2011, which is hereby incorporated by reference in its entirety.

BACKGROUND

Field of the Invention

The present invention generally relates to mobile payments and more particularly to payments based on proximity and social contacts.

Related Art

More and more consumers are purchasing items and services over electronic networks such as, for example, the Internet. Consumers routinely purchase products and services from merchants and individuals alike. The transactions may take place directly between an on-line merchant or retailer and the consumer, and payment is typically made by entering credit card or other financial information. Transactions may also take place with the aid of an on-line or mobile payment provider such as, for example, PayPal, Inc. of San Jose, Calif. Such payment providers can make transactions easier and safer for the parties involved. Purchasing with the assistance of an on-line or mobile payment provider from the convenience of virtually anywhere using a mobile device is one main reason why on-line/mobile purchases are growing very quickly.

Typically, mobile payments are conducted between one payer and one payee and involve the payer receiving a bill or invoice from the payee and then providing full payment for the bill or invoice over an electronic network. However, in some situations, a bill or invoice may need to be 'split' or divided up into a plurality of bills. For example, a plurality of customers (payers) may order items together at a restaurant (payee), and those orders may be recorded for the plurality of customers as a group and presented in a single bill to the plurality of customers. The payment of such a bill with the assistance of a mobile payment provider raises a number of issues.

Conventionally, mobile payment for a bill that includes items to be paid for by a plurality of customers is accomplished by one of the customers entering the number of customers and a total amount due on the bill into a payer device. The payer device divides the total amount due by the number of customers to generate an equal amount due for each customer, and then sends a payment request to each customer. The customer using the payer device pays the total amount due on the bill with the assistance of the mobile payment provider, and then must wait to get reimbursed by each of the customers according to the payment requests sent using the payer device. Alternatively, each customer receives a request on each customer's respective mobile device, and each customer then makes a payment for the individually split amount to the payee.

The above process typically requires the payer to enter individual email addresses for each customer. If the number of participants rises over two, it quickly becomes very cumbersome to enter the required email addresses.

Thus, there is a need for an improved bill splitting system for use in making mobile payments.

SUMMARY

According to one embodiment, an application or a mobile App on a payer's mobile device discovers people known to the user and who are in close proximity to the user at the time of a payment request. Discovery can be through searching contact lists and/or social networks of the payer and/or through the payer device discovering contacts around the payer and then searching the payer's contact or social network list to see if there are any matches. These people are then shown to the user on the user or payer device, such as with a photo, icon, name, and/or email address. The user selects desired ones, which causes requests to be sent to the selected people, such as through text, voice, or email, to the respective devices. The selected people can then easily confirm or authorize a payment be sent to the payer or to the payee.

As a result, the payer does not need to manually search for and/or enter individual email addresses during a group payment or bill splitting transaction.

These and other features and advantages of the present disclosure will be more readily apparent from the detailed description of the embodiments set forth below taken in conjunction with the accompanying figures.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for determining a pool of possible payers within a group known to the primary payer or user. When the user is ready to pay a bill or make a payment, a payment provider is notified, who then determines the location of the user. People known to the user are identified, such as through a user's contact list and/or one or more social networks of the user. The locations of those people identified are determined, and those in close proximity to the user's current location are presented to the user on the user device. The people may be shown with a photo, name, email address, or other identifier. The user then selects desired ones to share the payment. The payment provider sends requests to the selected people to make a payment. Once received, individual ones of the selected people can make a payment to the user or to the payee through the payment provider.

Thus, instead of requiring the user or customer to enter one or more email addresses or navigate through a lengthy contact list, friends or colleagues around the user can be automatically identified. After calculating the amount per person, instead of prompting the user for email addresses, the application could leverage its proximity capabilities (e.g., BlueTooth, GPS, or another technology) to not only discover the people around the user but to also utilize the user's contact list, LinkedIn list, or Facebook friend list to filter the discovered group down to only those known to the user.

In another embodiment, there is no filtering of only people known to the user. In this embodiment, all people in proximity to the user are presented to the user on the user device. This can be advantageous for different reasons. For example, there may be a person not on a user contact list or other social/networking list who should share in the payment. This may include a friend of a friend, a new acquaintance, or simply a friend who the user has not yet entered into any searchable list. In another example, the user may want to identify all people in the area, such as during a charity event. The user could select everyone at the event discoverable by the payment provider and have a request for a donation sent to everyone. This makes it easier for people to donate something, resulting in a likelihood of a greater overall donation.

Figure 1:
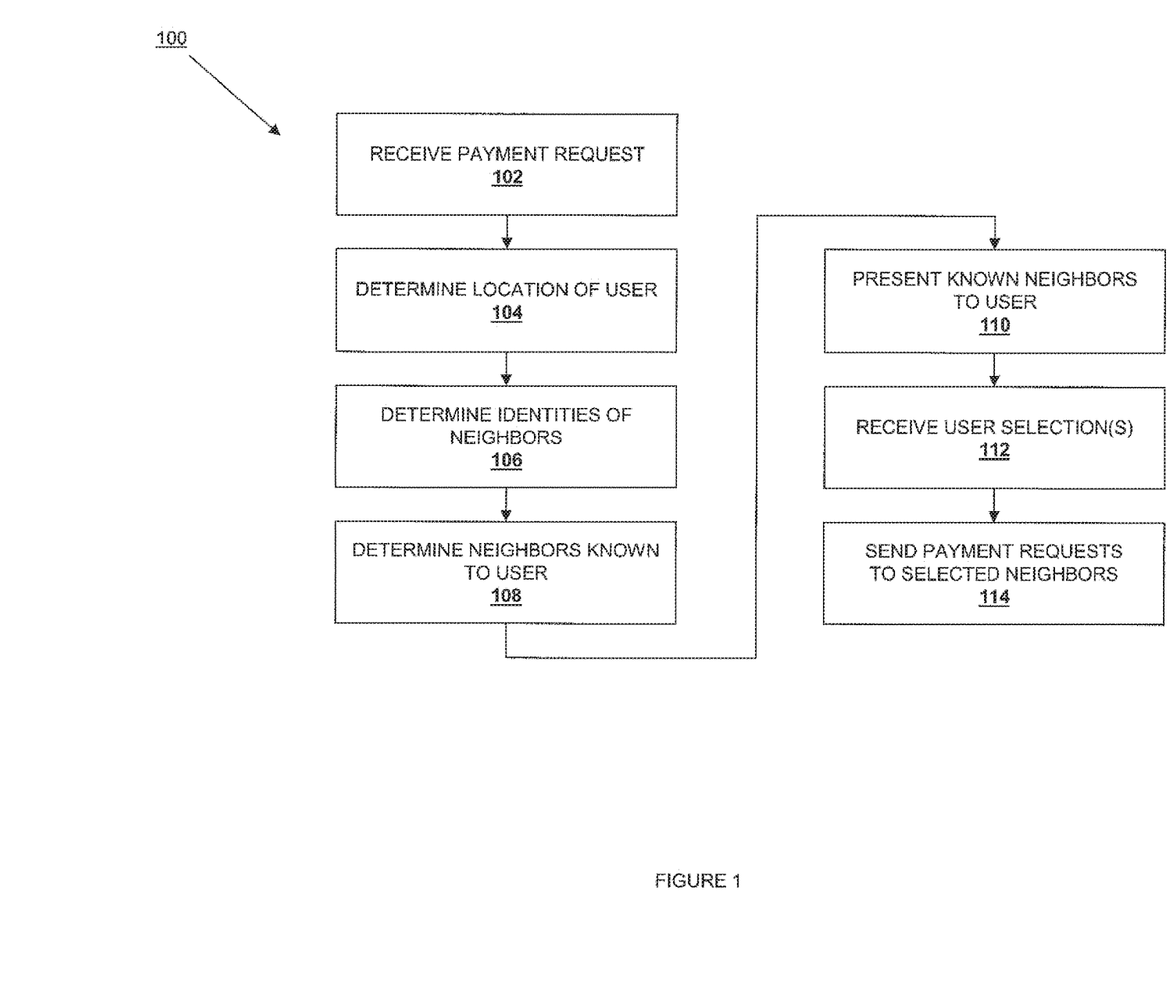
FIG. 1 illustrates a method according to one embodiment for determining payees and processing a payment request with selected payees.

FIG. 1 illustrates a method 100 according to one embodiment for determining payees and processing a payment request with selected payees. At step 102, a payment provider, such as PayPal, Inc. of San Jose, Calif., receives a payment request from a user. The payment request may be received electronically through a user device, such as a mobile smart phone, a computing tablet, a PC, or other suitable device. In this embodiment, the payment request is for making a payment to a payee, where the user wishes to split the payment with one or more other payers at a restaurant. However, one of skill in the art will recognize that the present disclosure is not so limited, and a variety of other situations that involve the splitting of a bill or making a payment between a plurality of payees fall within its scope.

The payment request may be received by the payment provider at a server or processor of the payment provider for processing. Included in the payment request is information about the user, such as a user identifier, account number, device identifier, or the like. This allows the payment provider to identify the user making the payment request. The payment request may also include information about the payee (e.g., the restaurant), such as identity, location, account number, etc. and details of the transaction or payment request, such as the amount.

Figure 2:
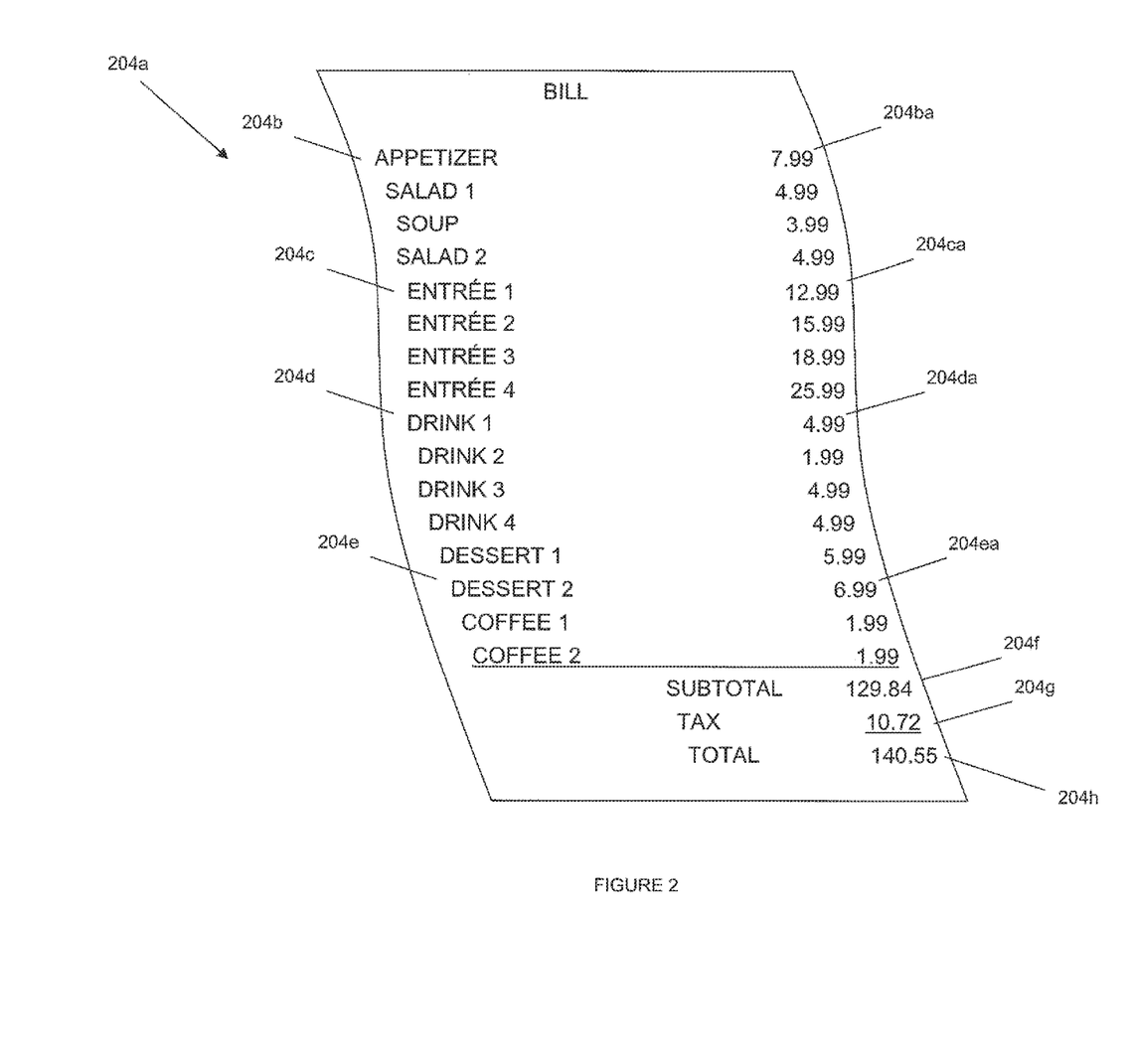
FIG. 2 shows one example of how information from a payment request may be sent by the user.

FIG. 2 shows one example of how information from a payment request may be sent by the user. The user or payer at the restaurant may be presented with a physical bill 204a that includes a plurality of items, such as items 204b, 204c, 204d, and 204e, that were ordered by people at the same table or area as the user. Each item is associated on physical bill 204a with a cost, such as costs 204ba, 204ca, 204da, and 204ea. In additional, a subtotal 204f, which may be the sum of the costs of the items, is included on physical bill 204a, along with a tax 204g associated with subtotal 204f (e.g., 8.25% of the total in the illustrated embodiment) and a total 204h that may be the sum of subtotal 204f and tax 204g. While a particular physical bill has been described and illustrated, one of skill in the art will recognize that a variety of physical bills and/or invoices may replace physical bill 204a without departing from the scope of the present disclosure. A user device may then capture an image of physical bill 204a using, for example, a camera on the payer device to take an image of the physical bill as is known in the art. The user device may then use optical character recognition techniques to generate a primary bill that is an assignable digital representation of physical bill 204a. In other embodiments, a digital bill or invoice may be sent to the user device by the restaurant.

Referring back to FIG. 1, after the payment request is received, the payment provider determines the location of the user at step 104. This can be done in any suitable way, such as determining the user's location through a GPS feature on the user's device or the location of the restaurant. The user may also directly inform the payment provider of the current location.

Once the user location is determined, identities of people in proximity to (e.g., "neighbors") the user are determined. "In proximity" may be defined in different ways, depending on the user, the payment provider, or the location of the user. For example, the user may set preferences that the payment provider determine people within 100 feet of the user location determined at step 104. Alternatively, the payment provider may set a distance to define the geographic "fence" for the user. In yet another example, the payment provider may determine the distance based on the location of the user. For example, if the user is in a densely populated location, such as a convention, restaurant, or mall, the distance may be shorter than when the user is in a sparsely populated location, such as at a county fair.

With a defined boundary, the payment provider can determine how many user devices are within the boundary. This may be accomplished by determining which devices are emitting a signal to enable a location to be obtained for the device and then determining which of those devices are within the specified distance from the user location. Proximity to the user device may also be determined by other means, such as NFC communication between devices. For example, using a Bump®-type network, adjacent devices and the user device may bump each other to engage in communication. Once a communication is opened, the payment provider may be able to detect these devices. In the present embodiment, the payment provider may determine people at the user's table, along with others in the restaurant or even outside the restaurant. The identities may be determined through the signal emitted from the different user devices. For example, a device may emit a signal that includes a device identifier, which the payment provider may use to determine a phone number or user of the device, such as by searching through a database of the payment provider.

Once neighbors of the user are identified, those neighbors known to the user are determined, at step 108. The payment provider may compare the neighbors found at step 106 with people in the user's contacts and/or social networks, such as Facebook®, LinkedIn®, etc. Note that steps 104, 106, and 108 may be combined in different combinations or performed in a different sequence.

Figure 3:
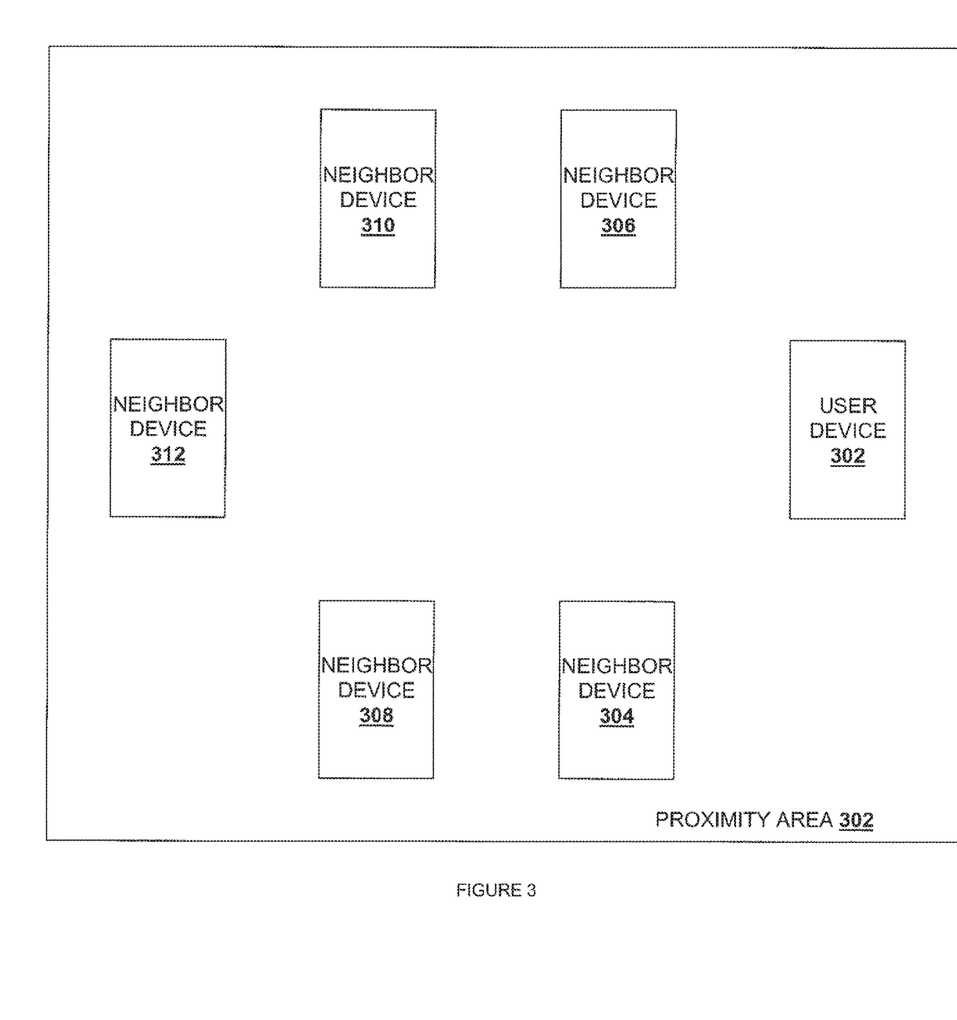
FIG. 3 is a diagram illustrating a user device and discovered neighbor devices.

Continuing with the current embodiment and referring to FIG. 3, the payment provider may determine that within a specified proximity or distance 300 from a user or user device 302, two people or neighbor devices 304 and 306 known to the user are at the user's table, but that also three other people or neighbor devices 308, 310, and 312 known to the user are within close proximity (e.g., in or just outside the restaurant).

Figure 4:
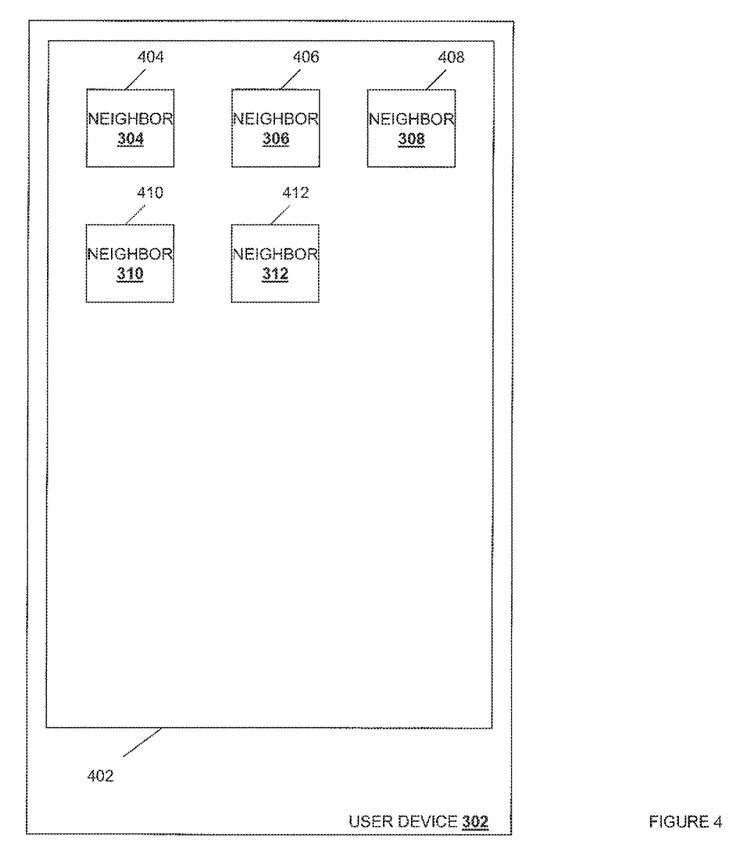
FIG. 4 is an exemplary partial display of user device 302 displaying a visual representation of the known neighbors.

Referring back to FIG. 1, once people known to the user and within a certain distance from the user (i.e., "known neighbors") are determined, the results are presented to the user at step 110, such as on a display of the user device. FIG. 4 is an exemplary partial display of user device 302 displaying a visual representation of the known neighbors. Known neighbors or devices 304, 306, 308, 310, and 312 are shown as visual representations 404, 406, 408, 410, and 412, respectively, on a display screen 402. Visual representations can be one or more of a photo, a name, an image, an icon, and/or a user name. For example, visual representations 404 and 408 may be photos retrieved from the user's Facebook® account or LinkedIn® account, and visual representations 406, 410, and 412 may be names from the user's contact list.

Upon viewing display screen 402, the user can determine whether the people to share in a payment are all displayed. There may be various reasons for not having all the people displayed, such as one or more devices not turned on or unable to be located by the payment provider and/or a located neighbor "unknown" to the user, e.g., the neighbor is not in any searched database (contact list) or site (Facebook®, LinkedIn®).

At step 112, the payment provider receives, from the user through the user device, people who will be sharing payment of the bill. For those shown on display screen 402, the use may simply select desired ones, such as by tapping, checking a corresponding box, or dragging and dropping the representation to an appropriate location on the display. If the user wishes to add others not shown on the screen, the user can manually enter those in any suitable manner, such as entering an email address, user name, phone number, or other identifier recognizable to the payment provider. The user may also electronically enter and communicate the information, such as by "bumping" with the desired user device with a Bump® network or other NFC communication.

Figure 5:
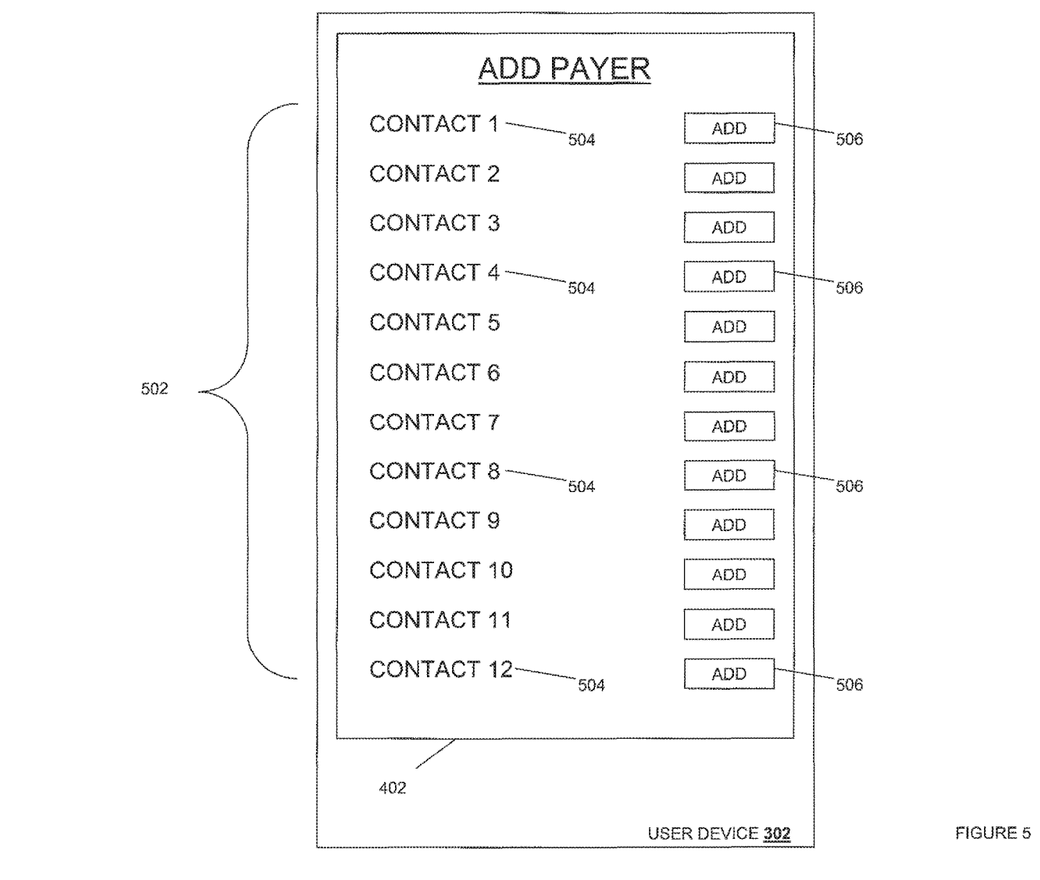
FIG. 5 is an exemplary display on a user device for adding additional desired payers.

An example of one way for the user to select and for the payment provider to receive desired people to share the bill is shown in FIG. 5. The user may access a contact list 502 and select one or more contacts 504 stored on the user device to be added as payers (e.g., by selecting an "ADD" button 506). Information associated with a contact, such as email address, name, and phone number, may then be sent to the payment provider to add as an additional payer. If a visual representation is available, the newly added payer(s) can be shown on the user display with previously presented representations.

Once all desired payers are selected, the user may be asked to confirm. If the payers received by the payment provider is not accurate or complete, the user may revise as needed. For example, the user can select ones to be deleted, such as by checking or selecting a delete box. The user can also add payers, such as by manually entering an identifier (e.g., an email address or phone number) of a new payer.

Referring back to FIG. 1, after desired payers are identified and confirmed (which would include the user and the selected neighbors), payment requests are sent, at step 114, to the selected payers. The requests may be sent from a server or computing device of the payment provider to mobile devices of the selected payers. For example, each selected payer, including the user, may receive a text or email request to pay a certain amount. Other information may include the recipient of the payment. The payer can then select to pay and authenticate/confirm as needed, such as by entering a password or PIN. The individual payments may then be made directly to the payee, i.e., the restaurant.

In another embodiment, the payment request is sent only to the payers selected by the user. Again, the payment request may include an amount for each payer to pay, along with the payment recipient. In this case, the payment recipient is the user. Once each payer is authenticated and confirms payment, the payment is processed by the payment provider and deposited with the user in a user account, typically with the payment provider. The user pays the restaurant the entire amount. This can be done in a separate transaction, such as conventionally with a credit card, check, or cash, or through the payment provider with a separate payment request sent to the user. Once the payment is approved, such as by authentication and confirmation, the payment provider processes the payment by debiting an account of the user and crediting an account of the payee (the restaurant).

Once payment is processed, notifications may be sent to the various payers and/or the payee, such as to their mobile devices through text, email, voice, or the like.

The amount requested of each payer may vary or be split equally. For an equal split, the payment provider determines the number of payers and divides the total amount of the bill with the number of payers. That amount, with any additional fees/charges, is included in the payment request. For a varied split, the user may determine the amount to request from each payer, such as by entering an amount corresponding to each selected payer. Payers may also modify the requested amount, such as by increasing the amount for an extra tip or other reason.

Thus, using the method described herein, a user may easily share a bill or payment with known neighbors without having to manually enter information, such as email addresses, for each and every person sharing the payment. Visual representations also allow the user to quickly identified desired persons, as well as provide the user with a more pleasant user interface during the payment process.

In another embodiment, step 108 may be omitted from the method in FIG. 1, which gives the user a larger number of people to select from for a payment request. This may be useful in a fund raising or charity event. In particular, an event organizer may be presented with all locatable people having a user device within a geographic location of the event, such as in a ballroom. The user may select all the people presented. The payment provider may then send a payment request in the form of a donation request all the people. The request may have a nominal or relatively low donation amount, which can be revised by each payer. As such, potential donors can be easily found and contacted for payment.

Figure 6:
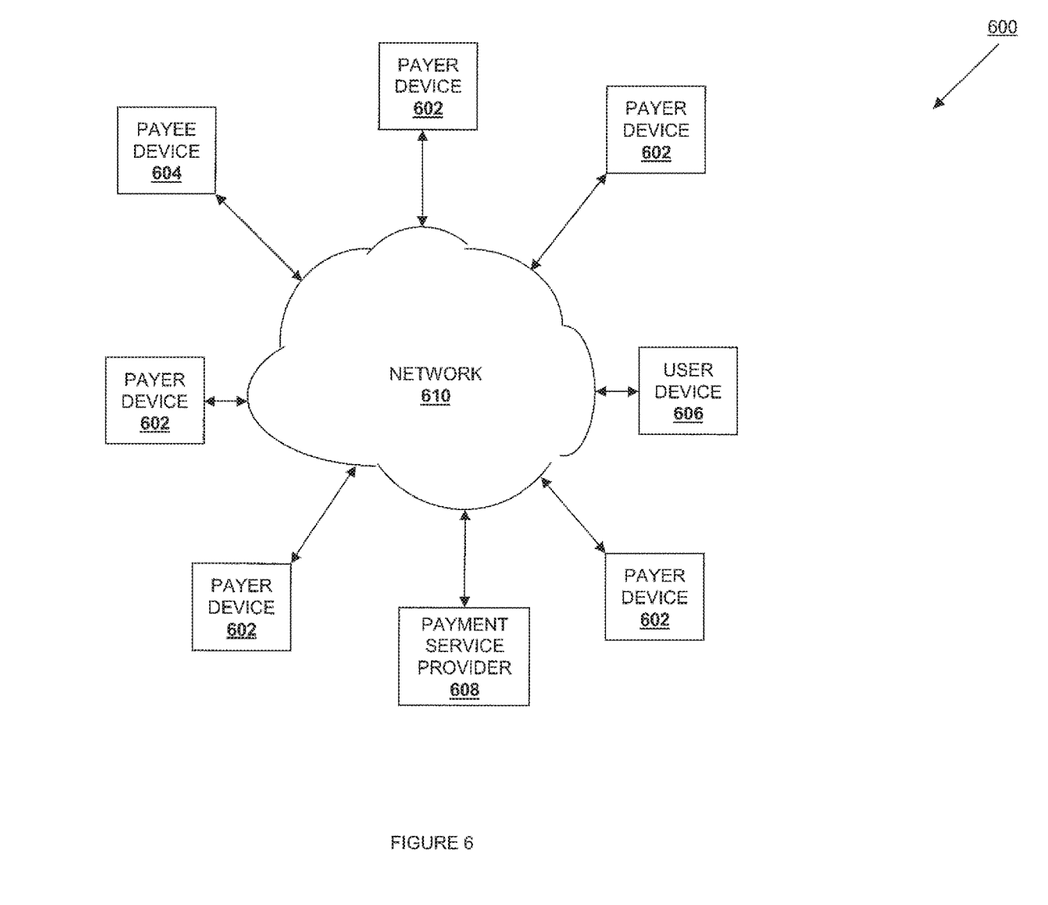
FIG. 6 shows an embodiment of a networked system used in a social proximity identification and payment process.

FIG. 6 shows an embodiment of a networked system 600 used in the social proximity identification and payment process described above. Networked system 600 includes a plurality of payer devices 602 (neighbors), a payee device 604 (restaurant), a user device 606 (primary payer), and a payment provider device 608 in communication over a network 610.

Payer devices 602, payee device 604, user device 606, and payment provider device 608 (discussed in further detail below) may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of system 600, and/or accessible over the network 610.

Network 610 may be implemented as a single network or a combination of multiple networks. For example, in various embodiments, network 610 may include the Internet and/or one or more intranets, landline networks, wireless networks, and/or other appropriate types of networks.

Payer device 602 and user device 606 may be implemented using any appropriate combination of hardware and/or software configured for wired and/or wireless communication over network 610. For example, in one embodiment, payer device 602 and user device 606 may be implemented as a smart phone of a payer in communication with the Internet. In other embodiments, payer device 602 and user device 606 may be a personal computer, personal digital assistant (PDA), laptop computer, tablet, and/or other types of computing devices.

Payer device 602 and user device 606 may include one or more browser applications which may be used, for example, to provide a convenient interface to permit the payer to browse information available over network 610. For example, the browser application may be implemented as a web browser or mobile App configured to view information available over the Internet.

Payer device 602 and user device 606 may also include one or more toolbar applications or mobile apps which may be used, for example, to provide payer-side processing for performing desired tasks in response to operations selected by the payer. In one embodiment, the application may display a user interface in connection with the browser application.

Payer device 602 and user device 606 may further include other applications or mobile apps as may be desired in particular embodiments to provide desired features to payer device 602 and user device 606. In particular, the other applications or apps may include a payment application/app for payments through the payment provider. The other applications/apps may also include security applications for implementing user-side security features, programmatic user applications for interfacing with appropriate application programming interfaces (APIs) over network 610 or other types of applications. Email and/or text applications/apps may also be included, which allow the payer to send and receive emails and/or text messages through network 610. Payer device 602 and user device 606 includes one or more user and/or device identifiers which may be implemented, for example, as operating system registry entries, cookies associated with the browser application, identifiers associated with hardware of payer device 602 and user device 606, or other appropriate identifiers, such as a phone number. In one embodiment, the user identifier may be used by the payment provider to associate the payer with a particular account maintained by the payment provider.

Payee device 604 may be maintained, for example, by an on-line merchant, digital goods seller, individual seller, restaurant, bar, and/or entity or person offering various products and/or services in exchange for payment to be received over network 610. In this regard, payee device 604 may include a database identifying available products and/or services (e.g., collectively referred to as items) which may be made available for viewing and purchase by the payer.

Payee device 604 also includes a checkout application/app which may be configured to facilitate the purchase by the payee of items. The checkout application/app may be configured to accept payment information from the payers, user, and/or from the payment service provider over network 610.

Figure 7:
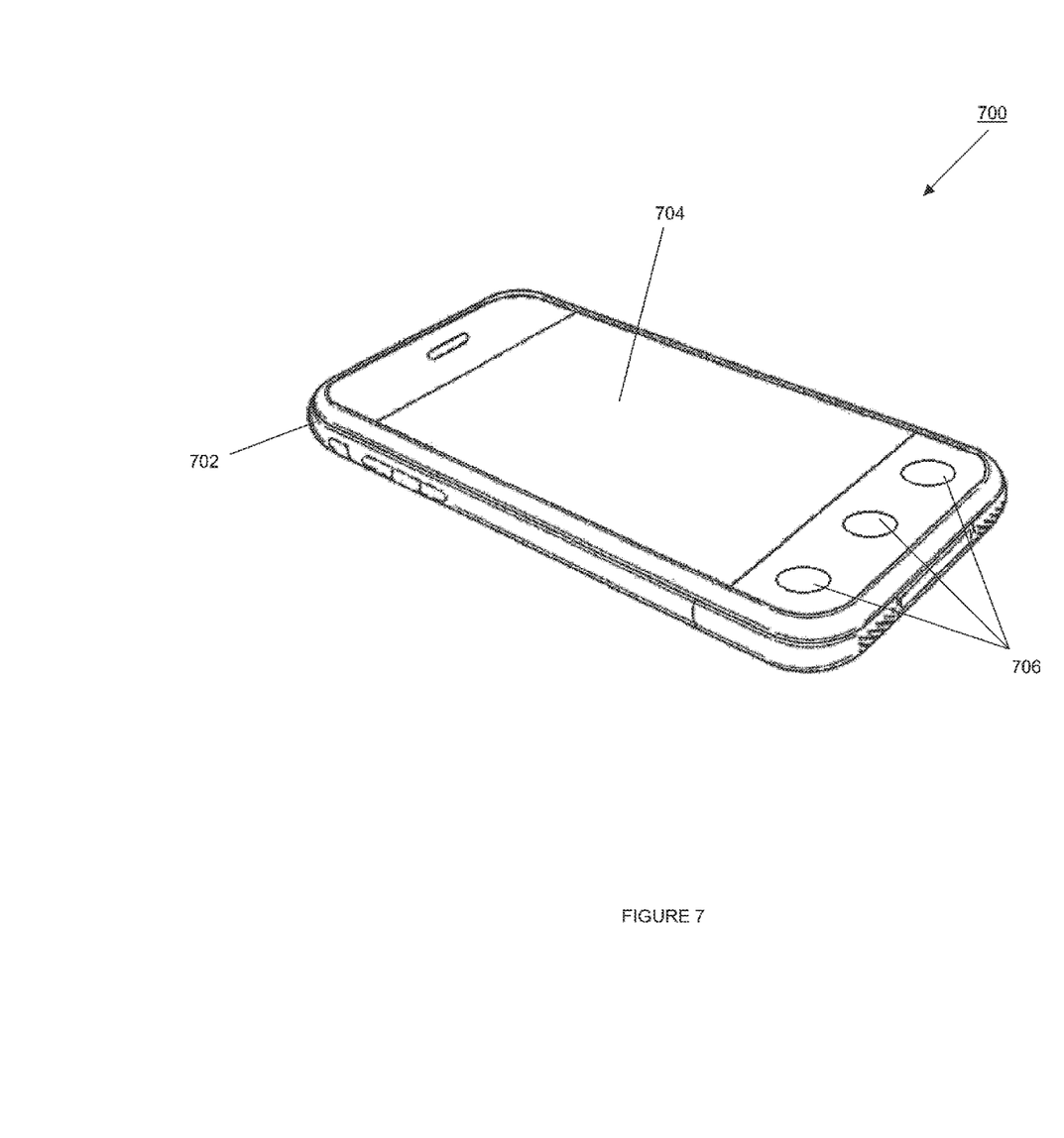
FIG. 7 shows an embodiment of a payer or user device.

FIG. 7 shows an embodiment of a payer device 700. Payer device 700 may be any or all of the payer devices and/or user device described herein. Payer device 700 includes a chassis 702 having a display 704 and an input device including display 704 and a plurality of input buttons 706. One of skill in the art will recognize that the payer device 400 is a portable or mobile phone including a touch screen input device and a plurality of input buttons that allow the functionality discussed above with reference to the method of FIG. 1. However, a variety of other portable or mobile payer devices may be used in the method of FIG. 1 without departing from the scope of the present disclosure.

Figure 8:
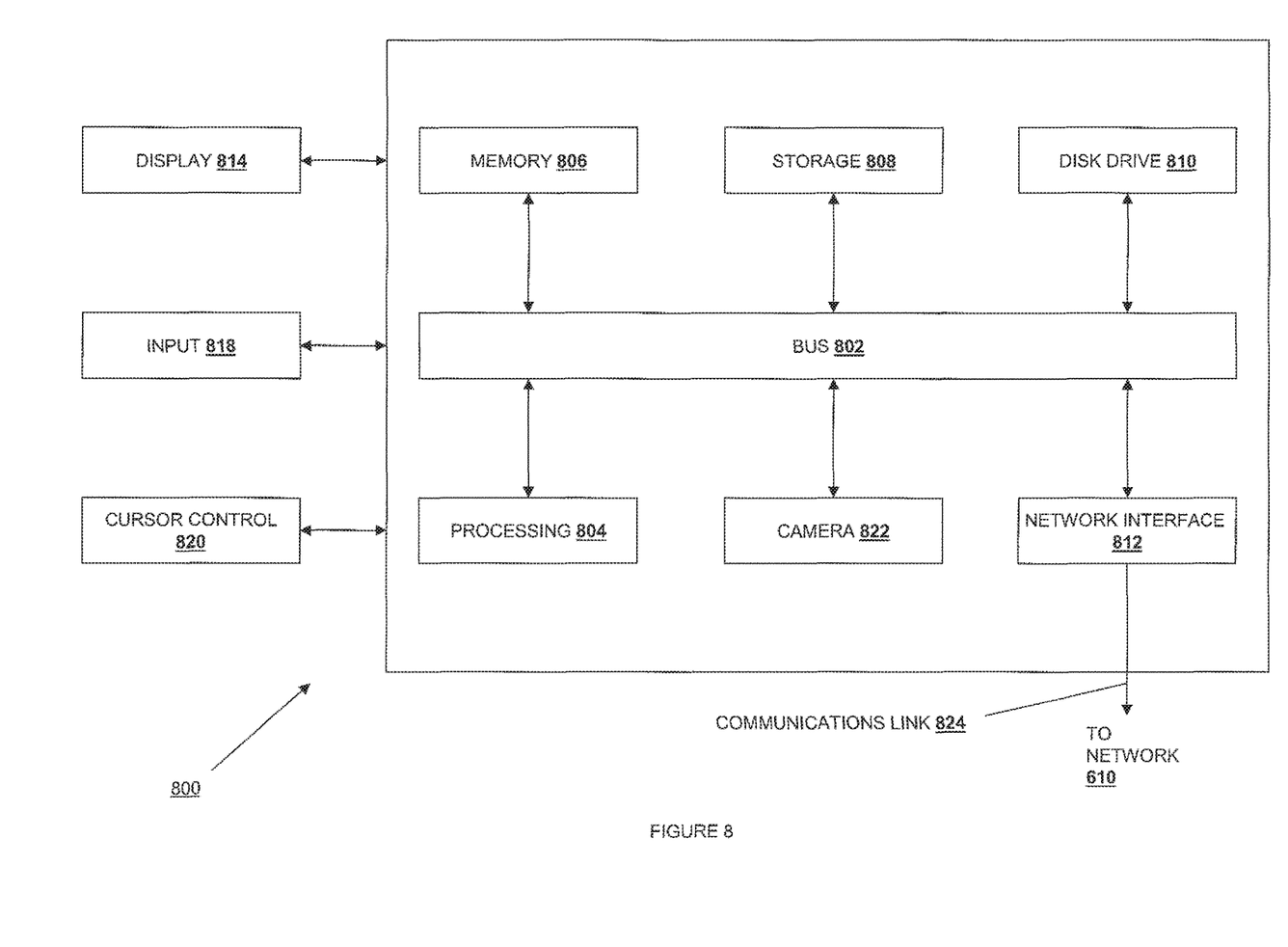
FIG. 8 shows an embodiment of a computer system suitable for implementing the various devices described herein.

FIG. 8 shows an embodiment of a computer system 800 suitable for implementing, for example, various payer, user, payee, and payment provider devices described herein. In various implementations, the device(s) may comprise a computing device (e.g., a computer, laptop, smart phone, PDA, etc.) capable of communicating with network 610.

In accordance with various embodiments of the present disclosure, computer system 800, such as a computer, smart phone, and/or a network server, includes a bus 802 or other communication mechanism for communicating information, which interconnects subsystems and components, such as a processing component 804 (e.g., processor, micro-controller, digital signal processor (DSP), etc.), a system memory component 806 (e.g., RAM), a static storage component 808 (e.g., ROM), a disk drive component 810 (e.g., magnetic or optical), a network interface component 812 (e.g., modem or Ethernet card), a display component 814 (e.g., CRT or LCD), an input component 818 (e.g., keyboard, keypad, or virtual keyboard), a cursor control component 820 (e.g., mouse, pointer, or trackball), and/or a camera 822. In one implementation, the disk drive component 810 may comprise a database having one or more disk drive components.

In accordance with embodiments of the present disclosure, the computer system 800 performs specific operations by the processor 804 executing one or more sequences of instructions contained in system the memory component 806, such as described herein with respect to the payer device, the payee device, the user device, and/or the payment provider device. Such instructions may be read into the system memory component 806 from another computer readable medium, such as the static storage component 808 or the disk drive component 810. In other embodiments, hard-wired circuitry may be used in place of or in combination with software instructions to implement the present disclosure.

Logic may be encoded in a computer readable medium, which may refer to any medium that participates in providing instructions to the processor 804 for execution. Such a medium may take many forms, including but not limited to, non-volatile media, volatile media, and transmission media. In various implementations, non-volatile media includes optical or magnetic disks, such as the disk drive component 810, volatile media includes dynamic memory, such as the system memory component 806, and transmission media includes coaxial cables, copper wire, and fiber optics, including wires that comprise the bus 802. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by the computer system 800. In various other embodiments of the present disclosure, a plurality of the computer systems 800 coupled by a communication link 824 to network 610 (e.g., such as a LAN, WLAN, PTSN, and/or various other wired or wireless networks, including telecommunications, mobile, and cellular phone networks) may perform instruction sequences to practice the present disclosure in coordination with one another.

The computer system 800 may transmit and receive messages, data, information and instructions, including one or more programs (i.e., application code) through the communication link 824 and the network interface component 812. The network interface component 812 may include an antenna, either separate or integrated, to enable transmission and reception via the communication link 824. Received program code may be executed by processor 804 as received and/or stored in disk drive component 810 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and seller; however, a user or consumer can pay virtually, or otherwise interact with any type of recipient, including charities and individuals. The payment does not have to involve a purchase, but can be a loan, a charitable contribution, a gift, etc. Thus, merchant as used herein can also include charities, individuals, and any other entity or person receiving a payment from a user. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A device comprising:
    a non-transitory memory;
    one or more hardware processors coupled to the non-transitory memory and configured to read instructions from the non-transitory memory to cause the device to perform operations comprising:
        receiving, over a first network connection, a digital invoice from a merchant at a device location;
        transmitting, over a second network connection, a payment request to a payment provider for payment of the digital invoice from a user associated with the device;
        determining a population density for the device location;
        determining a boundary area surrounding the device based on the determined population density;
        determining, using a global positioning system, other devices in proximity to the device, the other devices being in proximity when located within the determined boundary area;
        identifying other users associated with the other devices, wherein the identifying comprises comparing the other users to a contact list or a social network of the user associated with the device;
        presenting, on a display of the device, a visual representation of the other users identified;
        receiving a selection of one or more desired payers from the visual representation of the other users identified;
        transmitting, over the second network connection, a payer request to the payment provider including the selection of the one or more desired payers for payment of the digital invoice; and
        receiving, over the second network connection, a notification from the payment provider indicating a payment of the digital invoice.

2. The device of claim 1, wherein the determined boundary area decreases as the population density associated with the device location increases.

3. The device of claim 1, wherein the operations further comprise:
    receiving, on the display of the device, an input indicating additional users for the selection of the one or more desired payers, wherein the additional users are not present in the visual representation.

4. The device of claim 3, wherein the additional users are input using an email address for each of the additional users.

5. The device of claim 1, wherein the operations further comprise receiving from at least one of the one or more desired payers a modification of a payment amount for the payment of the digital invoice.

6. The device of claim 1, wherein the operations further comprise receiving, via the display of the device, an input indicating an amount for each of the one or more desired payers to pay, and wherein each amount for each of the desired payers is included in the payer request.

7. The device of claim 1, wherein the determining a population density for the device location comprises determining a device density of the other devices for the device location, wherein the device density comprises an amount of the other devices associated with the device location.

8. A method comprising:
    receiving, over a first network connection, a digital invoice from a merchant at a device location;
    transmitting, over a second network connection, a payment request to a payment provider for payment of the digital invoice from a user associated with a device;
    determining a population density for the device location;
    determining a boundary area surrounding the device based on the determined population density;

determining, using a global positioning system, other devices in proximity to the device, the other devices being in proximity when located within the determined boundary area;

identifying other users associated with the other devices, wherein the identifying comprises comparing the other users to a contact list or a social network of the user associated with the device;

displaying, on a display of the device, a visual representation of the other users identified;

receiving a selection of one or more desired payers from the visual representation of the other users identified;

transmitting, over the second network connection, a payer request to the payment provider including the selection of the one or more desired payers for payment of the digital invoice; and receiving, over the second network connection, a notification from the payment provider indicating a payment of the digital invoice.

9. The method of claim 8, wherein the payment request to the payment provider includes at least one of a merchant identifier, a user identifier, or the device location.

10. The method of claim 8, wherein the determined boundary area increases as the population density associated with the device location decreases.

11. The method of claim 8, further comprising:
receiving, on the display of the device, an input indicating additional users for the selection of the one or more desired payers, wherein the additional users are not present in the visual representation.

12. The method of claim 11, wherein the additional users are input using an email address for each of the additional users.

13. The method of claim 8, further comprising receiving a modification of a payment amount for the payment of the digital invoice from at least one of the one or more desired payers.

14. The method of claim 8, further comprising receiving, via the display of the device, an input indicating an amount for each of the one or more desired payers to pay, and wherein each amount for each of the desired payers is included in the payer request.

15. A non-transitory machine-readable medium having stored thereon machine-readable instructions executable to cause a machine to perform operations comprising:
receiving, over a first network connection, a digital invoice from a merchant at a device location;
transmitting, over a second network connection, a payment request to a payment provider for payment of the digital invoice from a user associated with a device;
determining a population density for the device location;
determining a boundary area surrounding the device based on the determined density;
determining, using a global positioning system, other devices in proximity to the device, the other devices being in proximity when located within the determined boundary area;
identifying other users associated with the other devices, wherein the identifying comprises comparing the other users to a contact list or a social network of the user associated with the device;
displaying, on a display of the device, a visual representation of the other users identified;
receiving a selection of one or more desired payers from the visual representation of the other users identified;
transmitting, over the second network connection, a payer request to the payment provider including the selection of the one or more desired payers for payment of the digital invoice; and
receiving, over the second network connection, a notification from the payment provider indicating a payment of the digital invoice.

16. The non-transitory machine-readable medium of claim 15, wherein the operations further comprise receiving a modification of a payment amount for the payment of the digital invoice.

17. The non-transitory machine-readable medium of claim 15, wherein the determined boundary area decreases as the population density associated with the device location increases.

18. The non-transitory machine-readable medium of claim 15, further comprising:
receiving, on the display of the device, an input indicating additional users for the selection of the one or more desired payers, wherein the additional users are not present in the visual representation.

19. The non-transitory machine-readable medium of claim 18, wherein the additional users are input using an email address for each of the additional users.

20. The non-transitory machine-readable medium of claim 15, wherein the operations further comprise receiving, via the display of the device, an input indicating an amount for each of the one or more desired payers to pay, and wherein each amount for each of the desired payers is included in the payer request.

* * * * *